P. C. LAWSON.
FASTENING DEVICE OR TOGGLE.
APPLICATION FILED AUG. 23, 1911.
1,019,057.
Patented Mar. 5, 1912.
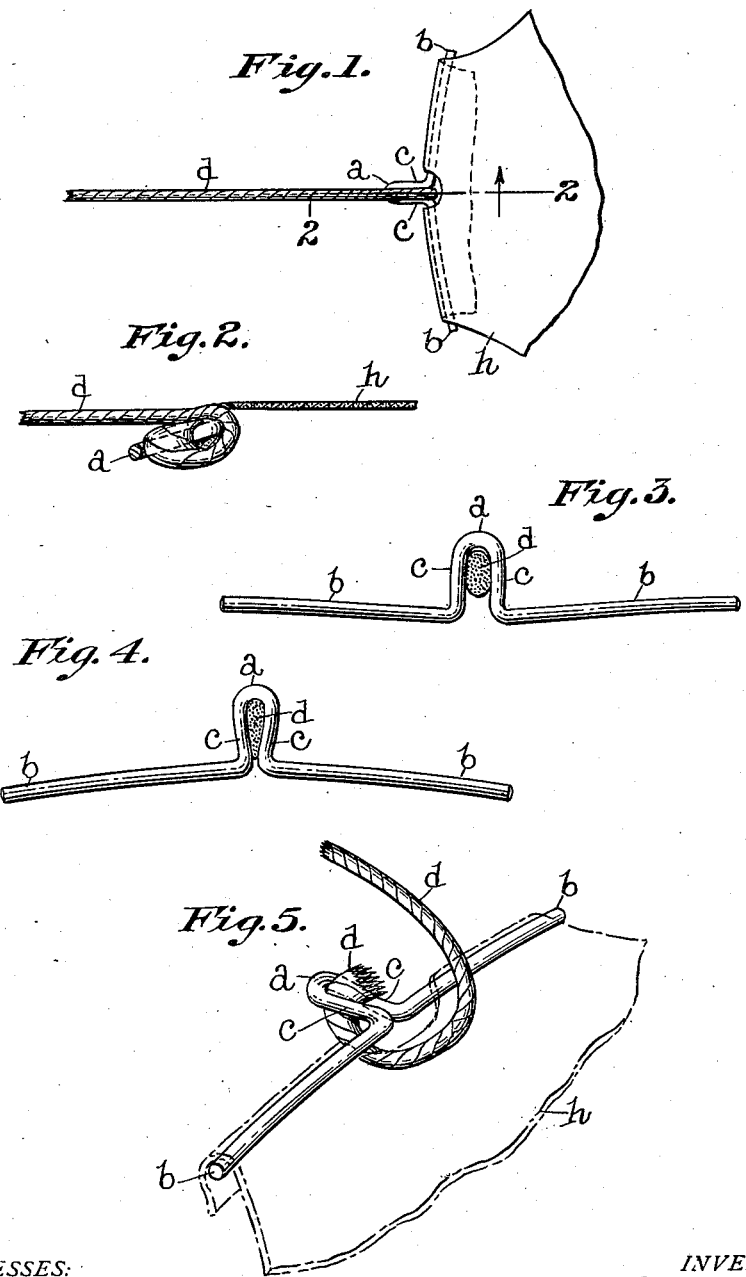
WITNESSES:
INVENTOR.
Peter C. Lawson
BY
Jas. H. Churchill
ATTORNEY.

UNITED STATES PATENT OFFICE.

PETER C. LAWSON, OF BOSTON, MASSACHUSETTS.

FASTENING DEVICE OR TOGGLE.

1,019,057.           Specification of Letters Patent.      Patented Mar. 5, 1912.

Application filed August 23, 1911.   Serial No. 645,619.

*To all whom it may concern:*

Be it known that I, PETER C. LAWSON, a citizen of the United States, residing in Boston, county of Suffolk, and State of Massachusetts, have invented an Improvement in Fastening Devices or Toggles, of which the following description, in connection with the accompanying drawings, is a specification, like letters on the drawings representing like parts.

This invention relates to a fastening device or "toggle" especially designed and adapted for use in tanneries and like places for attaching leather to stretching frames.

The present invention has for its object to provide an efficient and inexpensive toggle or fastening device for the purpose specified, comprising a metallic member and a fibrous member, which is firmly secured to the metallic member in fixed relation thereto so as to form a permanent part of the toggle ready for use, whereby a very material saving in the cost of construction and in time, is effected, while at the same time a superior toggle is obtained.

To this end, the toggle comprises a metallic member composed of a wire rod bent substantially at its center to form bearing arms for engagement with the leather and a loop or eye, whose side arms are made of a length approximately equal to the diameter of the flexible fibrous member, such as a cord, and are compressed at their ends adjacent to the bearing arms to grip the said cord with such firmness as to resist disengagement by longitudinal strain on the cord, and thereby practically permanently secure the cord to the metal member.

Figure 1 is a plan of a toggle embodying this invention in its operative relation to the leather. Fig. 2, a section on an enlarged scale, taken on the line 2—2, Fig. 1. Fig. 3, a detail showing the members assembled but not secured together. Fig. 4, a detail showing the members secured together, and Fig. 5, a plan view to illustrate the manner in which the toggle is used.

The metallic member of the toggle comprises a wire rod, preferably circular in cross-section, which is bent substantially at its center to form a loop or eye $a$ and bearing arms $b$ extended in opposite directions from the side arms $c$ of the said loop. The side arms $c$ of the loop are normally separated as represented in Fig. 3 to form a loop having a wide mouth of substantially the diameter of the cord or fibrous member $d$, so that the said cord may be quickly and easily passed through said mouth and laid in the loop. The side arms $c$ are further made substantially short and of a length approximately equal to the diameter of the cord, so that the latter is elongated in cross section and firmly gripped between the said arms when their ends adjacent to the bearing arms $b$ are compressed and forced together as represented in Fig. 4. In this manner, the cord $d$ is secured in fixed relation to the metallic member to form a complete toggle capable of being shipped in condition for use, thereby avoiding loss of time in the tannery in connecting the cord with the member which engages the leather as in devices of this character as now made and used.

By firmly clamping or gripping the cord between the ends of the arms $c$ adjacent to the bearing arms $b$, the toggle can be produced at a minimum expense, inasmuch as the metal member can be made of a minimum length of wire, as but little wire is required to form the loop or eye, and further a very material saving in the length of cord required is effected, as no knots are required in the cord, which latter can be gripped in close proximity to the end thereof. Furthermore, the bearing arms extend directly from the loop and are capable of yielding slightly when strain is placed on the cord, as in the drying rooms of the tannery, thereby avoiding or at least diminishing breaking of the cord by contraction.

The wire rod being of small diameter, enables the hole in the leather to be made close to the edge of the latter, thereby effecting saving in stock.

By reference to Figs. 3 and 4, it will be seen that the cord $d$ is materially lengthened in cross section at the part which is gripped between the arms $c$ of the loop.

In operation, the loop $a$ of the metal member is passed through the hole in the leather $h$ near the edge of the latter, and the free end of the cord $d$ is then passed under the edge of the leather, up through the hole, and then away from the metal member as represented in Figs. 1 and 2, the free end of the cord being fastened in a suitable manner to the stretching frame (not shown). It will be observed that the rear portion of the bearing arms $b$ engage the leather, and when pull is exerted upon the loop or eye $a$, the inner ends of the arms move outwardly and impart a resiliency to the toggle which takes care of the contraction of the cord and avoids tearing of the leather, which enables the hole in the leather to be made near the edge thereof and effects a saving in stock, as the portion beyond the hole is cut off after the leather has been finished with its patent or enamel coating.

Claim:

A fastening device or toggle of the character described, comprising a metal member consisting of a wire rod bent intermediate of its ends to form bearing arms and a loop or eye having its side arms extended from said bearing arms in close proximity to each other, and a flexible, fibrous member having one end passed through said loop or eye and secured in fixed relation to the metal member by the resiliency of the said side arms between which the said fibrous member is gripped, substantially as described.

In testimony whereof, I have signed my name to this specification in the presence of two subscribing witnesses.

PETER C. LAWSON.

Witnesses:
 JAS. H. CHURCHILL,
 J. MURPHY.

Copies of this patent may be obtained for five cents each, by addressing the "Commissioner of Patents, Washington, D. C."